United States Patent [19]

Hanson et al.

[11] Patent Number: 4,879,042

[45] Date of Patent: Nov. 7, 1989

[54] METHOD OF CRYSTALLIZING SALTS FROM AQUEOUS SOLUTIONS

[76] Inventors: Donald N. Hanson, 522 Moraga Way, Orinda, Calif. 94563; Scott Lynn, 2646 San Antonio Dr., Walnut Creek, Calif. 94598

[21] Appl. No.: 159,372

[22] Filed: Feb. 23, 1988

Related U.S. Application Data

[63] Continuation-in-part of Ser. No. 178,870, Aug. 18, 1980, Pat. No. 4,430,227, Ser. No. 567,764, Jan. 30, 1984, abandoned, Ser. No. 774,953, Sep. 11, 1985, Pat. No. 4,632,760, and Ser. No. 946,809, Dec. 29, 1986, abandoned.

[51] Int. Cl.$^4$ .............................................. B01D 11/04
[52] U.S. Cl. ..................................... 210/642; 423/184
[58] Field of Search ................. 210/634, 642; 423/184

[56] References Cited

U.S. PATENT DOCUMENTS

| | | | |
|---|---|---|---|
| 2,967,825 | 1/1961 | Baniel | 210/642 X |
| 3,239,459 | 3/1966 | Patterson | 210/642 |
| 3,823,000 | 7/1974 | Johnson | 210/642 |

Primary Examiner—Frank Spear
Attorney, Agent, or Firm—Edward B. Gregg

[57] ABSTRACT

Method of crystallizing from aqueous solution an inorganic solute, whose solubility in water varies relatively litter with temperature such that crystallizing by adjustment of temperature results in low yield, such method comprising contacting a concentrated aqueous solution of the solute with a hydrophilic organic solvent at a temperature $T_1$, $T_1$ and the organic solvent being selected such that at $T_1$ a water-rich phase is formed in which the ratio of solute to water is less than the ratio found in the incoming aqueous solution, resulting in formation of crystals of solute. The resulting wet, organic-rich phase is separated and dried by contact with a concentrated aqueous solution of the solute at $T_2$. $T_2$ differs from $T_1$, preferably being less than $T_1$ if the solute dissolves exothermically in water and preferably being greater than $T_1$ if the solute dissolves endo- thermically in water. The resulting dried organic phase is recycled to the crystallizing zone. The resulting diluted aqueous solution is used to dissolve solid solute to provide the concentrated solution. In some cases the wet organic phase will separate into two phases at $T_2$, one solvent-rich phase and one water-rich phase, and the water-rich phase may then be treated to remove water from the process. A portion of the diluted aqueous solution may be employed to adjust the concentration of solution going to the crystallizing zone to the desired concentration.

17 Claims, 3 Drawing Sheets

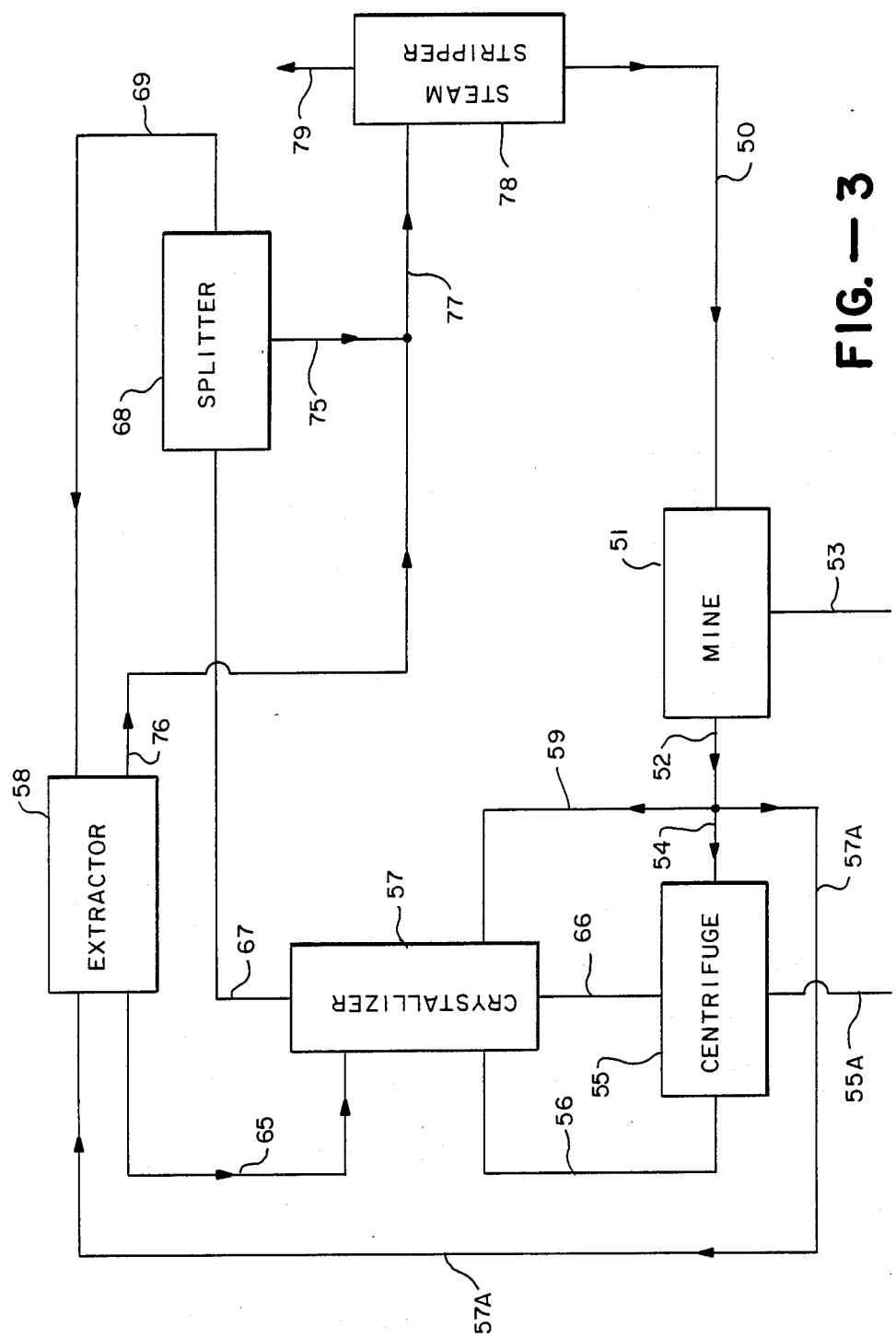
FIG.—3

METHOD OF CRYSTALLIZING SALTS FROM AQUEOUS SOLUTIONS

This application is a continuation-in-part of the following patent applications: Ser. No. 178,870, filed Aug. 18, 1980, entitled "METHOD OF CONCENTRATING AQUEOUS SOLUTIONS", now U.S. Pat. No. 4,430,227; Ser. No. 567,764, filed Jan. 30, 1984, similarly entitled now abandoned; Ser. No. 774,953, filed Sept. 11, 1985, similarly entitled, now U.S. Pat. No. 4,632,760 and Ser. No. 946,809, filed Dec. 29, 1986, similarly entitled now abandoned.

In our copending application Ser. No. 178,870 there is described a method of concentrating an aqueous solution of a non-volatile inorganic solute wherein the aqueous solution is contacted at a higher temperature $T_1$ with a suitable organic liquid to extract water from the aqueous solution and dissolve it in the organic liquid; the resulting organic phase (organic liquid used as extractant plus dissolved water) is cooled to a lower temperature $T_2$ to separate water; and the organic liquid is reused, normally with an added drying step. In our copending application Ser. No. 774,953 a method of drying the organic liquid is described This method of drying consists of contacting the wet organic liquid with a portion of the highly concentrated solution resulting from the process, or by use of an outside source of an aqueous solution or slurry or by a combination of both such means. In the examples cited in both the aforesaid copending applications the aqueous solution being concentrated are typified by solutions of sodium hydroxide.

We have now found an advantageous method of operating this process that is applicable for many salts less hydrophilic than sodium hydroxide and that uses organic liquids that are more hydrophilic than those suitable for extracting water from sodium hydroxide solutions. We have found that, for suitable combinations of salt and organic liquid, proper adjustment of the temperature not only can result in the water's being extracted partly into the organic phase but also can lead to the organic component's being extracted partly into the aqueous phase. Both phenomena lead to a sharp reduction in the solubility of the salt in the system, thereby greatly enhancing the amount of crystallization that occurs as the result of the interaction between the two liquids. After the two liquid phases have been contacted, the crystals are separated as a dense slurry in a part of one of the liquids. The crystals are subsequently recovered from the liquid by filtration or other of the common means of solid-liquid separation. A remarkable feature of this method of separation is that the desired temperature of crystallization, $T_1$, may be either above or below the temperature, $T_2$, at which the solvent is dried for recycle to the process. The choice depends on the solubility characteristics of the salt being crystallized. A second remarkable feature of this process is that the preferred solvents may be, but are not necessarily, miscible with pure water.

It is an object of the present invention to provide a method whereby solutions of relatively soluble salts such as sodium carbonate and sodium chloride may be concentrated by the use of organic liquids.

The present invention is illustrated by way of example in the accompanying drawings in which:

FIG. 3 is a flow sheet showing the practice of the invention to crystallize sodium chloride from an aqueous solution.

Figure 1:
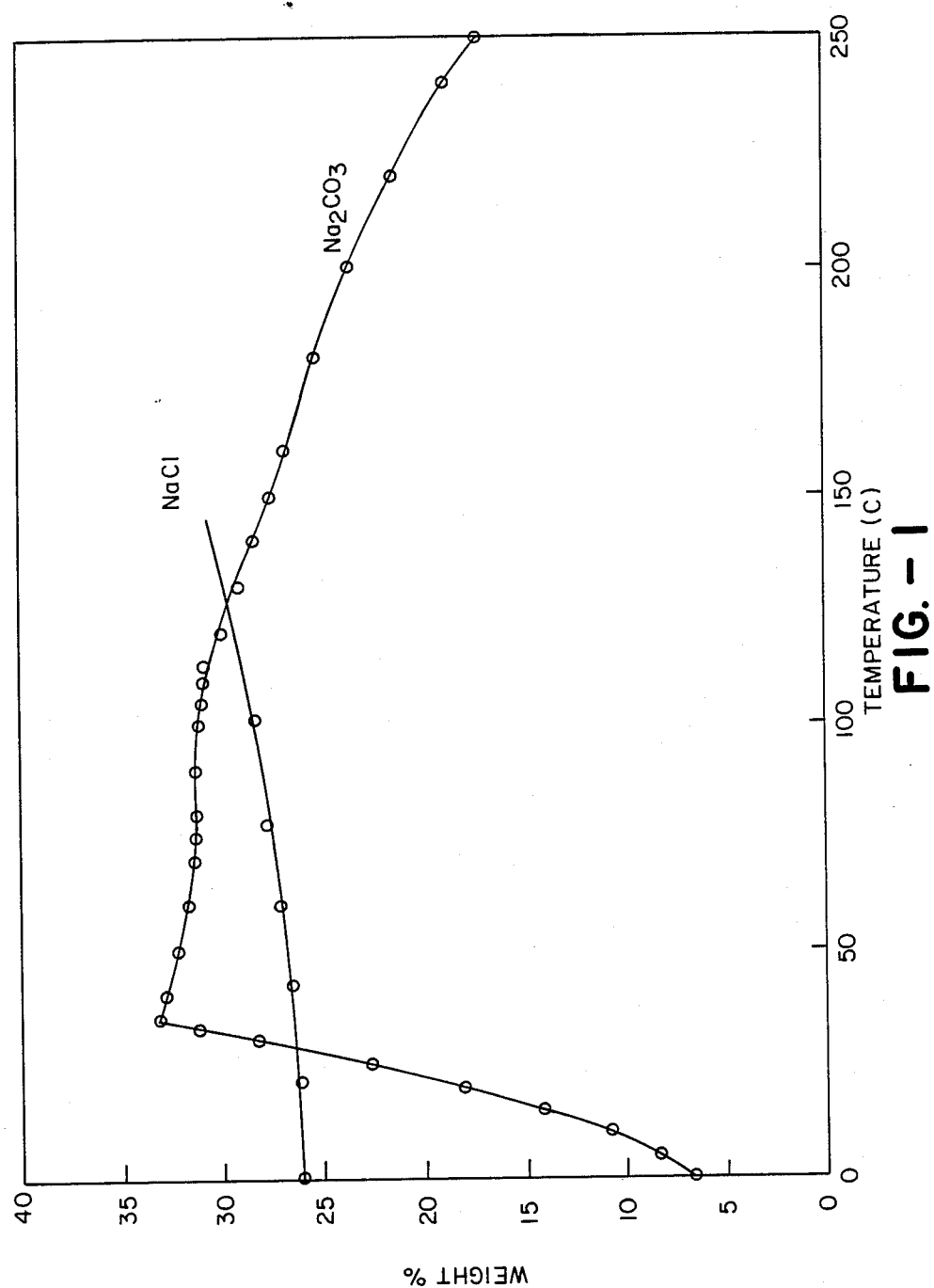
FIG. 1 is a graph showing solubilities of sodium carbonate and sodium chloride in water as functions of temperature.

As one example of this method of solvent-induced crystallization, consider the recovery of sodium carbonate from water. At temperatures above 40° C. the solubility of sodium carbonate in pure water decreases slightly with increasing temperature, as is shown in FIG. 1. This behavior indicates that the dissolution of the salt in water is a somewhat exothermic process. It also means that if one is to crystallize a given fraction of the sodium carbonate in an aqueous solution it is necessary to evaporate roughly an equal fraction of the water from the solution. Because of the relatively small dependence of solubility on temperature, it is not practical to carry out the crystallization by dissolving the salt at one temperature and effecting crystallization by shifting the temperature to a higher or lower value. As a result, the purification of raw sodium carbonate by crystallization, a commercial operation that is carried out on the scale of millions of tons per year, is a very energy-intensive process.

Normal-propyl alcohol (1-propanol) is completely miscible with water at ambient temperatures and pressures.

However, it is quite immiscible with a saturated aqueous solution of sodium carbonate at ambient temperatures and has a very low solubility in that solution. Indeed, a concentrated aqueous solution of sodium carbonate can be used to extract water and 1-propanol, thereby drying the latter. Table 1 below shows the composition of the two liquid phases, one propanol-rich and one water-rich, that are in equilibrium with solid sodium carbonate at various temperatures and at pressures that exceed the vapor pressure of the mixture at each temperature.

TABLE 1

| | Liquid Phase Compositions for the System 1-Propanol/Water/Sodium Carbonate* | | | | | |
|---|---|---|---|---|---|---|
| | Propanol-Rich Phase (wt %) | | | Water-Rich Phase (wt %) | | |
| Temperature °C. | $H_2O$ | PrOH | $Na_2CO_3$ | $H_2O$ | PrOH | $Na_2CO_3$ |
| 53 | 16.9 | 83.0 | 10.03 | 68.0 | 0.02 | 32.0 |
| 79 | 19.3 | 80.6 | 0.04 | 69.0 | 0.03 | 31.0 |
| 100 | 22.2 | 76.7 | 0.1 | 69.3 | 0.4 | 30.3 |
| 140 | 32.6 | 67.2 | 0.2 | 73.0 | 1.1 | 25.9 |
| 180 | 56.9 | 41.1 | 2.0 | 77.7 | 6.1 | 16.2 |
| 189 | 71.9 | 15.8 | 9.3 | 74.9 | 15.8 | 9.3 |

*System saturated with sodium carbonate at all temperatures.

The water content of the propanol-rich phase increases as the temperature increases. At temperatures above about 150° C. there is sufficient water in that phase to begin dissolving a significant amount of sodium carbonate. Similarly, at these higher temperatures the concentration of propanol in the aqueous phase begins to rise sufficiently to reduce the solubility of sodium carbonate by an amount that is significant relative to its solubility in pure water. The data in Table 1 show that, at temperatures of 189° C. and above, only one liquid phase exists in equilibrium with solid sodium carbonate regardless of the relative amounts of water and 1-propanol. The solubility of sodium carbonate in that phase varies from its solubility in pure water to essentially zero, depending on the relative amount of propanol present.

The qualitative behavior exhibited by the 1-propanol/water/ sodium carbonate system is not unique to this system. It is general for relatively hydrophilic solvents with aqueous solutions of salts that dissolve in water with a small release of heat. Useful solvents are miscible with water at $T_1$ (the temperature of crystallization), have a normal boiling point below about 150°, and are very sparingly soluble at $T_2$ (the temperature of solvent drying) in the concentrated aqueous salt solution used for drying the solvent. Such solvents include alcohols having four or fewer carbon atoms, ketones having six or fewer carbon atoms, ethers (including glycol ethers) having eight or fewer carbon atoms, and primary, secondary or tertiary amines having nine or fewer carbon atoms, etc. Examples are set forth in Table 2, but it will be understood that solvents not listed in Table 2 may also be used in the practice of the invention.

TABLE 2

| Solvents for Inducing Crystallization from Aqueous Salt Solutions. | |
|---|---|
| Alcohols | Methanol, ethanol, the propanols, the butyl alcohols |
| Ketones | Acetone, methyl ethyl ketone |
| Ethers | 1,2-Dimethoxy ethane, 2-methoxy ethanol, 1,4-dioxane |
| Amines | Ethylamine, diethylamine, trimethylamine |

Exothermically dissolving salts, besides sodium carbonate, include sodium sulfate, sodium sulfite, lithium carbonate, etc. It should be noted that some of the solvents referred to above, such as three of the four butyl alcohols, are not fully miscible with water at ambient temperature. This property, immiscibility with water at $T_2$, may be of use in some embodiments of the process to be described below.

Figure 2:
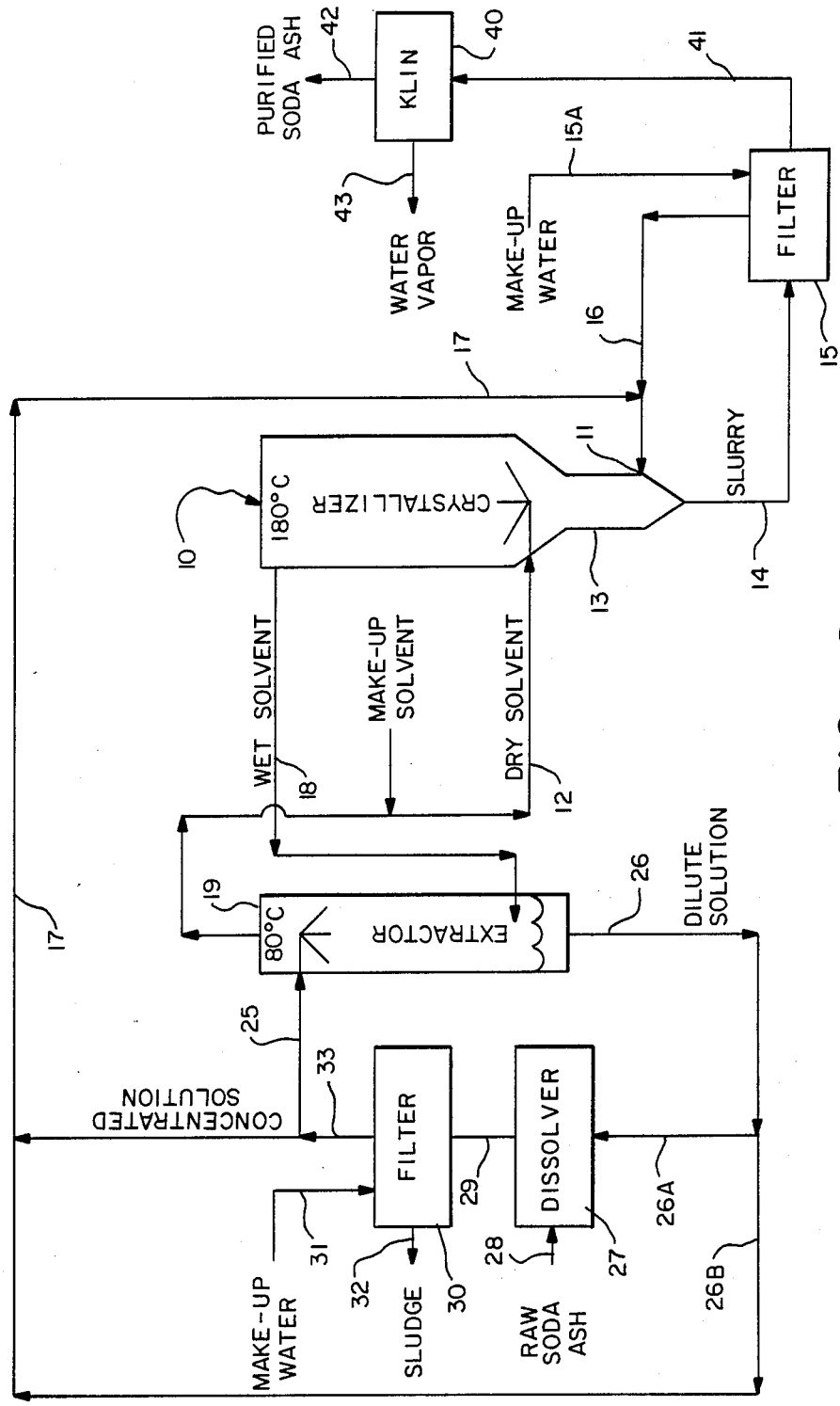
FIG. 2 is a flow sheet showing the practice of the invention to crystallize sodium carbonate from an aqueous solution.

An example of a flow configuration for a process that utilizes the behavior described above is shown in FIG. 2. In this process crystallizer 10, operating at a temperature of, for instance, 180° C., is fed with a concentrated aqueous solution of sodium carbonate, stream 11, and a solution containing primarily 1-propanol, stream 12. Both of the entering streams are also at 180° C. Stream 11 enters through a classifier section 13 that serves to retain smaller crystals in crystallizer 10 while allowing larger crystals to settle into a slurry, stream 14, and be transported to filter 15 to which make up water is supplied through line 15a. The filtrate, stream 16, is added to fresh aqueous feed, stream 17, and returned to crystallizer 10. The incoming propanol, stream 12, is dispersed in the aqueous phase that entered in stream 11. The propanol mixes with the sodium carbonate solution, thereby causing the bulk of the sodium carbonate to crystallize and precipitate. The presence of a large number of small crystals provides opportunity for crystal growth. Large crystals are desired for a commercial product. Note that the crystals formed under these conditions are of anhydrous sodium carbonate, in contrast to the monohydrate ($Na_2CO_3 \cdot H_2O$) that is commonly formed in sodium carbonate crystallization. The wet propanol solution, stream 18, leaving crystallizer 10 is cooled to a lower temperature, typically about 80° C., and fed to extractor 19 for drying. In extractor 19 the wet propanol from stream 18 is contacted in counter-current flow with a concentrated aqueous solution of sodium carbonate that enters in stream 25. The dried propanol leaves extractor 19 in stream 12 and is recycled to crystallizer 10.

The water and sodium carbonate extracted from the wet solvent dilute the sodium carbonate solution leaving extractor 19 in stream 26. Part of stream 26 passes through line 26A to dissolving pit 27 for saturation with raw sodium carbonate entering at 28. It will frequently be necessary to strip the aqueous stream in line 26A of its solvent content, in a step not shown in FIG. 1, before it reaches dissolving pit 27.

The resulting impure solution of sodium carbonate passes through line 29 to filter 30, make-up water being added through line 31. Sludge is removed through line 32. Concentrated sodium carbonate solution leaves through line 33, part going to extractor 19 through line 25 and part to line 17, thence to crystallizer 10. Another portion of dilute solution in stream 26 passes through line 26B to stream 33 to dilute it to the composition of stream 17, which is just less than saturated with sodium carbonate at the temperature of crystallizer 10.

Also shown in FIG. 1 are a kiln 40 supplied at 41 with wet sodium carbonate which is dried in the kiln to produce dry product at 42 and water vapor at 43.

It will be understood by those skilled in the art that heat exchange (not shown in FIG. 1) is required between the streams entering and leaving the process and that some net heating and cooling is required to provide for the necessary temperature driving force in this heat exchange. If a solvent is used that is not fully miscible with pure water at $T_2$, such as 1-butanol, it may be advantageous to recover as a separate stream the aqueous phase that separates from the organic phase when the wet solvent is cooled. This step would be desirable when the source of salt was a saturated solution or a hydrated salt as opposed to a calcined raw solid salt. The aqueous phase so obtained could be stripped of its residual alcohol content with relatively little input of energy and removed from the process to reject water.

Referring again to Table 1, it will be seen that at 189° C. and higher temperatures only a single liquid phase is in equilibrium with solid sodium carbonate. The composition of the single liquid phase at about 189° C. and above is variable but there is only a single liquid phase. It is within the scope of the present invention to form such a single liquid phase and to recover sodium carbonate (or other salt) from the single liquid phase without forming two liquid phases, i.e. a solvent-rich phase and a water-rich phase. The single liquid phase may be altered in temperature to $T_2$, i.e. to a temperature below 189° C. in the system shown in Table 1, to form a solvent-rich phase and a water-rich phase, which may then be suitably processed, e.g. as in the FIG. 2.

As a second example of the practice of this invention consider the crystallization of sodium chloride from aqueous solution. The solubility of sodium chloride in pure water is also shown as a function of temperature in FIG. 1. The small increase in solubility with temperature is an indication that the solution of sodium chloride is a slightly endothermic process. However, this change of solubility with temperature is again sufficiently small to prevent using temperature change alone to effect crystallization on a commercial scale and it is necessary to evaporate all of the water from the solution to carry out the crystal- lization. A solvent that can be used to effect crystal- lization is ethylene glycol dimethyl ether, (1,2-dimethoxy ethane) commonly known as glyme. Glyme is miscible with water in all proportions but is not completely miscible with solutions of sodium chloride. The compositions of the two liquid phases in equilibrium with solid sodium chloride is given as a function of temperature in Table 3, below.

TABLE 3

Liquid Phase Compositions for the System Glyme**/Water/Sodium Chloride*

| Temperature °C. | Glyme-Rich Phase (wt %) | | | Water-Rich Phase (wt %) | | |
|---|---|---|---|---|---|---|
| | $H_2O$ | Glyme | NaCl | $H_2O$ | Glyme | NaCl |
| 0 | 6.8 | 93.2 | — | 45.3 | 45.8 | 8.9 |
| 22 | 6.4 | 93.6 | — | 58.1 | 27.4 | 14.5 |
| 50 | 6.8 | 93.2 | — | 67.5 | 10.1 | 22.4 |
| 75 | 6.7 | 93.3 | — | 68.0 | 8.6 | 23.4 |
| 100 | 7.1 | 92.9 | — | 68.2 | 7.0 | 24.8 |

**Glyme = 1,2-dimethoxy ethane.
*System saturated with sodium chloride at all temperatures.

It is seen that at temperatures above 75° C. relatively little glyme dissolves in the aqueous phase. This trend is caused by the increasing solubility of sodium chloride at higher temperatures. However, the data in Table 3 show that, as the temperature of the system drops below 50° C., glyme becomes progressively more soluble in the aqueous phase, and its presence reduces the solubility of sodium chloride substantially. It would thus be practical to operate a process for the purification of raw sodium chloride by crystallization quite analogous to the one described above for sodium carbonate. The difference would be that the temperature of the crystallization step, $T_1$, would be lower (rather than higher) than the temperature of the solvent-drying step, $T_2$.

As still another example of the practice of the invention, crystallization of sodium chloride from aqueous solution, using an amine as solvent, can be shown. Table 4 provides data from the system sodium chloride (NaCl), water ($H_2O$), and diisopropyl amine (DIPA), saturated with NaCl at various temperatures.

TABLE 4

Liquid Phase Compositions for the System Diisopropyl Amine/Water/Sodium Chloride*

| Temperature °C. | Amine-Rich Phase (wt %) | | | Water-Rich Phase (wt %) | | |
|---|---|---|---|---|---|---|
| | $H_2O$ | DIPA | NaCl | $H_2O$ | DIPA | NaCl |
| −6.8 | 40.48 | 52.00 | 7.52 | 73.50 | 2.40 | 24.10 |
| −6.3 | 38.55 | 54.65 | 6.80 | 73.78 | 2.21 | 24.01 |
| −4.9 | 33.37 | 61.35 | 5.28 | 73.50 | 2.01 | 24.49 |
| −3.4 | 26.10 | 70.80 | 3.10 | 73.06 | 1.64 | 25.30 |
| −1.85 | 21.48 | 76.62 | 1.90 | 73.13 | 1.49 | 25.38 |
| 0.3 | 17.15 | 81.90 | 0.95 | 73.10 | 1.55 | 25.35 |
| 25.0 | 6.67 | 93.27 | 0.06 | 73.39 | 0.64 | 25.97 |
| 38.7 | 5.03 | 94.92 | 0.05 | 73.12 | 0.78 | 26.10 |
| 54.0 | 4.40 | 95.55 | 0.05 | 73.15 | 0.00 | 26.85 |
| 73.8 | 3.10 | 96.80 | 0.10 | 72.60 | 0.00 | 27.40 |

*System saturated with sodium chloride.

At temperatures of 20° C. and higher, relatively little water and almost no salt are dissolved in the amine phase. At temperatures approximately 0° C. and lower, however, substantial amounts of water are dissolved in the amine phase. While some salt is also dissolved in the DIPA at these lower temperatures, the ratio of salt to water is much less than in the aqueous phase. Mixing diisopropyl amine and saturated brine in the low temperature portion of the process causes crystallization of sodium chloride because water is extracted from the aqueous phase. Since the extracted water is not accompanied by a proportionate amount of salt in the amine phase a solid salt phase must form. The amine phase is then separated from the aqueous phase and raised in temperature to reject from it the water which was extracted.

FIG. 3 is a flow sheet devised for an example process in which sodium chloride is removed from an underground deposit by solution mining and recovered by crystallizing the salt from aqueous solution by means of diisopropyl amine.

A dilute aqueous stream (16.5 wt. % NaCl) is sent through line 50 to the mine 51, where NaCl is dissolved to produce a saturated stream (24% NaCl) at line 52. Make up water is introduced through line 53. Some of the stream in line 52 is used in line 54 to wash the crystalline NaCl produced in the process in centrifuge 55 which leaves through line 55a. The brine then leaves centrifuge 55 through line 56 and is sent through line 56 to the low temperature crystallizer 57, operated, for example, at −5° C. A second portion of brine in line 52 is sent through line 57a to extractor 58 to dry the amine solvent phase used in the process. The bulk of the flow of saturated brine in line 52 enters the crystallizer 57 through line 59 where it is mixed with the dried amine phase entering through line 65. The crystallizer 57 is at a low temperature, therefore substantial water is extracted into the amine phase, causing solid salt to form. The salt is sent as a slurry through line 66 to centrifuge 55, which separates the solid from the liquid. The dilute amine phase leaves through line 67 and is raised in temperature to approximately 30° C., whereupon it breaks into two phases that are separated in the splitter 68. The amine-rich portion leaves the splitter in line 69 and enters the extractor 58 where it is dried by contact with a countercurrent flow of a concentrated brine stream from line 57a. The amine stream leaves the extractor in line 65 for reuse in the crystallizer.

The water-rich phase leaves the splitter 68 through line 75 and is joined by the diluted brine flow in line 76 from the extractor 58 to produce a dilute brine (approximately 17% NaCl) in line 77 which is treated to remove residual amine in the steam stripper 78. The purified, dilute brine is sent through line 50 to the mine. Amine stripped from the brine is removed through line 79, condensed and recycled to a suitable point in the process.

It is understood that much heat exchange equipment is used in the process. Through such heat exchange equipment the energy loads of the process are minimized. Temperature levels somewhat above or below those cited are also useful.

Salts that can be crystallized most advantageously by the method of operation described above are those that absorb a small amount of heat upon dissolving in water and include ammonium sulfate, lithium hydroxide and potassium carbonate as well as sodium chloride Useful solvents are miscible with water at $T_1$, have a normal boiling point below 150°, and are only sparingly soluble at $T_2$ in the concentrated aqueous salt solution used for drying the solvent. Such solvents include alcohols and ketones with four or fewer carbon atoms, ethers with six or fewer carbon atoms, and primary, secondary and tertiary amines having six or fewer carbon atoms.

Solvent-induced crystallization thus displays the following characteristics:

(a) Crystallization is carried out at a temperature, $T_l$, at which the mixing of the solvent with a concentrated aqueous solution of the salt results in a substantial reduction of the solubility of the salt in the resulting mixture. This may happen either because of the solvent's dissolving in the aqueous phase, forcing salt out of solution, or through extraction of water out of the aqueous phase, thereby causing crystallization of the salt because that phase has become supersaturated. A solvent-rich liquid phase is formed which contains essentially all of the organic solvent introduced into the crystallizer together with a large fraction of the water that had been in the concentrated salt solution. Depending upon $T_1$ and the solvent, this solvent-rich phase may be the only liquid phase present or it may be present in the crystallizer together with a water-rich phase.

(b) Drying of the solvent-rich phase resulting directly from step (a) or from adjusting the temperature of the single liquid phase formed in step (a) is carried out at a second temperature, $T_2$, usually aided by extracting water from the solvent-rich phase with a concentrated aqueous solution or slurry of the same salt that is to be crystallized in step (a). It will generally be the case that a raw salt, which is to be purified and recovered as part of this process, will be dissolved and its solution will be used for this drying step.

(c) It is generally desirable that $T_1$ be greater than $T_2$ for salts that dissolve exothermically in water and less than $T_2$ for salts with an endothermic heat of solution.

(d) It is preferred that the solvent be miscible in all proportions with pure water at $T_1$ to enhance its ability to extract water from the concentrated salt solution and to increase its extraction into the salt solution. It is preferred that at $T_2$ the solvent be only sparingly soluble (less than about 10% by weight) in the concentrated aqueous salt solution used for drying to minimize the amount of solvent in the diluted aqueous solution that leaves the drying step. A relatively volatile solvent is more readily stripped from that solution when such stripping is required.

Some solvents, e.g. 1-propanol and glyme, are completely miscible with water, therefore require the presence of the salt (e.g. sodium carbonate or sodium chloride) in the form of the solid salt or as a concentrated aqueous solution, to achieve drying of the solvent-rich phase. Other solvents, e.g. 1-butanol, are not completely miscible with water; therefore drying of the solvent-rich phase can be achieved by temperature adjustment alone. However, even with such solvents it is preferred to assist drying of the solvent-rich phase by contact with solid salt or with a concentrated solution of the salt before recycling the solvent to the process.

Where it is necessary or desirable to withdraw water from the system to avoid build up of water, e.g. where the solute contains a significant quantity of water of crystallization or where the input is a concentrated aqueous solution of inorganic solute, a solvent may be selected which is not completely miscible with water, e.g. 1-butanol. The wet solvent separated from the crystallizer, or a portion of the wet solvent, may be cooled so as to split into an aqueous phase and an organic phase; the aqueous phase may be steam distilled to recover solvent; and the residue (aqueous phase) may be discarded.

It will therefore be apparent that a new and useful method of crystallizing inorganic solutes from aqueous solutions has been provided.

We claim:

1. A method of crystallizing an inorganic solute which has a solubility in water which changes relatively little with temperature, said method comprising:

(a) providing a concentrated aqueous solution of the solute, (b) contacting such solution at a temperature $T_1$ with a hydrophilic organic solvent to form either (1) a solvent-rich phase and a water-rich phase or (2) a single solvent-rich liquid phase, the relative quantity of solvent and $T_1$ being selected so that the solubility of the solute in the resulting liquid mixture is substantially reduced, thereby causing a fraction of the solute to precipitate as solid, (c) separating the precipitated solid inorganic solute, (d) separating all, or a major portion, of the solvent-rich phase from step (b) and subjecting it to a drying selected by heating or cooling it to a temperature $T_2$ selected to facilitate the drying operation, and (e) recycling the dried solvent from step (d) to step (b).

2. The method of claim 1 wherein the drying step (d) is assisted by contact of the solvent-rich phase at the adjusted temperature $T_2$ with (1) the solid solute or with (2) a concentrated aqueous solution of the solute.

3. The method of claim 1 wherein the solvent and solute are selected so that $T_1$ is greater than the adjusted temperature in step (d) and the solvent-rich phase is cooled in step (d).

4. The method of claim 1 wherein the solvent and solute are selected so that $T_1$ is less than the adjusted temperature in step (d) and the solvent-rich phase is heated in step (d).

5. The method of claim 3 wherein the inorganic solute is sodium carbonate.

6. The method of claim 4 wherein the inorganic solute is rock salt.

7. The method of claim 1 in which the adjustment of temperature in step (d) causes separation into a solvent phase and an aqueous phase, and a portion of the aqueous phase is separated for further treatment.

8. A method of crystallizing an inorganic solute from an aqueous solution, said solute having a solubility (in water) that changes relatively little with temperature such that the crystallization of solute from aqueous solution by adjustment of temperature results in a low yield, said method comprising:

(a) providing an aqueous solution of such solute which is saturated or substantially saturated at $T_1$ (b) providing a hydrophilic organic solvent (c) contacting solution (a) with solvent (b) at $T_1$ in a crystallizing zone, thereby producing (1) a solvent-rich phase and a water-rich phase or (2) a single solvent-rich liquid phase, $T_1$ being selected so that the ratio of the solute to water in the solvent-rich phase is substantially less than in solution (a), thereby causing crystallization of a portion of the solute, (d) separating crystals of solute, (e) separating all or a major portion of the solvent rich phase, (f) adjusting the temperature of the separated solvent-rich stream by heating or cooling it from $T_1$ to $T_2$, (g) contacting the solvent-rich stream from step (f) in an extraction zone with a concentrated aqueous solution of said solute at $T_2$, the temperature $T_2$ (differing from $T_1$) and the concentration of solute in the aqueous solution being such that the resulting dried solvent phase is suitable for recycling to the crystallizing zone, (h) separating from the extraction zone the dried solvent phase and recycling it to the crystallizing zone (i) separating from the extraction zone the diluted aqueous solution of solute (j) employing all or a portion of the diluted solution separated i step (i) to dissolve solute from a solid source, resulting in solution (a) and (k) employing the resulting solution (a) from step (j) in the crystallizing zone.

9. The method of claim 8 wherein $T_1$ is greater than $T_2$ and the solvent-rich stream is cooled to $T_2$.

10. The method of claim 8 wherein $T_1$ is less than $T_2$ and the solvent-rich stream is heated to $T_2$.

11. The method of claim 8 wherein a portion of the diluted solution resulting from step (i) is employed to dilute the solution used in step (k) to the desired concentration of solution (a).

12. The method of claim 8 in which the adjustment of temperature in step (f) causes the separated stream to split into a solvent phase and an aqueous phase, separating the solvent phase for processing in step (g) and separating a portion of the aqueous phase for further treatment.

13. The method of claim 8 wherein the solute is selected from the group consisting of sodium carbonate, sodium sulfate, sodium sulfite and lithium carbonate and the organic solvent is selected from the group consisting of methanol, ethanol, the propanols, the butyl alcohols, acetone, methyl ethyl ketone; 1,2-dimethoxy ethane; 2-methoxy ethanol; 1,4-dioxane, ethylamine, diethylamine and triethylamine.

14. The method of claim 13 wherein the solute is sodium carbonate and the solute is 1-propanol.

15. The method of claim 8 wherein the solute is selected from the group consisting of sodium chloride, ammonium sulfate lithium hydroxide and potassium carbonate and the organic solvent is selected from the group consisting of methanol, ethanol, the propanols, the butyl alcohols, acetone, methyl ethyl ketone; 1,2-dimethoxy ethane; 2-methoxy ethanol; 1,4-dioxane, ethylamine, diethylamine and triethylamine.

16. The method of claim 15 wherein the solute is sodium chloride and the organic solvent is glyme.

17. The method of claim 15 wherein the solute is sodium chloride and the organic solvent is diisopropylamine.

* * * * *